United States Patent [19]

Charles et al.

[11] 4,283,326
[45] Aug. 11, 1981

[54] PBT MOLDING COMPOSITIONS CONTAINING MICA AND A COMPOSITE POLYMER

[75] Inventors: John J. Charles, Bloomingdale; Robert C. Gasman, West Milford, both of N.J.

[73] Assignee: GAF Corporation, New York, N.Y.

[21] Appl. No.: 101,950

[22] Filed: Dec. 26, 1979

Related U.S. Application Data

[63] Continuation-in-part of Ser. No. 4,596, Jan. 18, 1979, abandoned, which is a continuation-in-part of Ser. No. 814,535, Jul. 11, 1977, Pat. No. 4,140,670.

[51] Int. Cl.$^3$ ..................... C08L 67/02; C08L 63/00
[52] U.S. Cl. .................................. 260/40 R; 525/64; 525/65
[58] Field of Search ..................................... 260/40 R

[56] References Cited

U.S. PATENT DOCUMENTS

| 3,814,725 | 6/1974 | Zimmerman et al. | 260/40 R |
|---|---|---|---|
| 4,034,013 | 7/1977 | Lane | 260/835 |
| 4,066,607 | 1/1978 | Breitenfellner et al. | 260/40 R |
| 4,096,202 | 6/1978 | Farnham et al. | 260/40 R X |
| 4,123,415 | 10/1978 | Wambach | 260/40 R |

OTHER PUBLICATIONS

"Low-Cost Suzorite Mica Flake Prevents Distortion in PBT", Marietta Resources Int'l., Aug. 1976.

Primary Examiner—Paul Lieberman
Assistant Examiner—Robert Sellers
Attorney, Agent, or Firm—James Magee, Jr.; Joshua J. Ward

[57] ABSTRACT

Poly ($C_2$–$C_4$ alkylene terephthalate) molding composition containing mica and a multiphase composite polymer. The multiphase polymer has a first elastomeric phase polymerized from a monomer system including $C_1$–$C_6$ alkyl acrylate as well as crosslinking and graftlinking monomers and has a final rigid thermoplastic phase polymerized in the presence of the elastomeric phase. Preferred compositions also include thermally stable reinforcing fibers such as glass fibers.

20 Claims, No Drawings

PBT MOLDING COMPOSITIONS CONTAINING MICA AND A COMPOSITE POLYMER

RELATED APPLICATION

This application is a continuation-in-part of our copending application Ser. No. 004,596 filed Jan. 18, 1979 now abandoned, which in turn was a continuation-in-part of our copending application Ser. No. 814,535 filed July 11, 1977, now U.S. Pat. No. 4,140,670.

BACKGROUND OF THE INVENTION

Polybutylene terephthalate (PBT) reinforced with thermally stable reinforcing fibers such as glass fibers is well known as a molding resin and is described in numerous patents and publications including for instance U.S. Pat. Nos. 2,814,725, 4,124,561, 3,814,786 and 3,625,024. Fiber reinforcement generally improves the tensile strength, flexural strength, flexural modulus and heat distortion temperature of the molding composition. However, moldings, especially injection moldings of large fiber glass reinforced articles of PBT, nylon and other semicrystalline thermoplastics tend to display distortion or warping while glass fiber reinforced amorphous thermoplastic compounds do not present such problems. It is believed that strains resulting from the different degrees of volumetric contraction parallel to and transverse to the direction of plastic melt flow into the mold during the cooling of molded articles are responsible for such warping. Orientation of the glass fibers parallel to the direction of melt flow during molding produces this directional difference in volumetric contraction. The warping is thus believed due to the presence of the very reinforcing fibers which contribute to the enhanced physical characteristics of the finished product. It is known that addition of mica to fiberglass reinforced PBT reduces warping. Unfortunately, the mica also greatly reduces impact strength.

Various impact modifiers are also known which improve the impact strength of molded PBT compositions. Some of these are described for instance in U.S. Pat. Nos. 4,096,202 and 4,034,013. It is generally believed and unfortunately true, that some modifiers which improve impact characterists of PBT or other poly ($C_2$–$C_4$ alkylene terephthalate) molding compositions, including fiber reinforced compositions, also tend to increase the warping characteristics of the compositions.

SUMMARY OF THE INVENTION

It is accordingly an object of the invention to provide an improved poly ($C_2$–$C_4$ alkylene terephthalate) molding composition and method for producing same as well as molded articles of such composition. As compared with known prior art compositions, the molded compositions of the invention have an especially desirable combination of properties including less than anticipated warpage and improved impact strength.

Improved polyester molding compositions of the invention consist essentially of at least about 40 wt% poly ($C_2$–$C_4$ alkylene terephthalate) with at least about 50 wt% of such poly ($C_2$–$C_4$ alkylene terephthalate) being polybutylene terephthalate having an intrinsic viscosity between about 0.5 and about 2.0 deciliters per gram (dl/g). Such molding compositions also include:

(a) between about 1 and about 40 wt% based on total molding composition of phlogophite mica flakes having an average particle size between about 40 and about 325 mesh; and (b) between about 5 and about 30 wt% based on total molding composition of a multiphase composite polymer comprising;

(1) about 25 to about 95 wt% of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and (2) about 75 to 5 wt% of a final, rigid thermoplastic phase polymerized in the presence of said elastomeric phase.

Preferred compositions of the invention include use of glass or other thermally stable reinforcing fibers and the use of the preferred multiphase polymers described below. Preferred thermally stable reinforcing fibers are glass fibers. Where used, thermally stable reinforcing fibers are preferably present in amounts between about 3 and about 50 wt% based on total molding composition and preferably have diameters between about 5 and about 20 microns and aspect ratios of at least about 5.

DETAILED DESCRIPTION OF THE INVENTION

As mentioned above; the invention includes a novel molding composition, molded articles of such composition and method for producing such composition. The molding composition broadly comprises poly ($C_2$–$C_4$alkylene terephthalate) containing, mica, multiphase composite polymer and preferably thermally stable reinforcing fibers, as described herein.

Polybutylene terephthalate (PBT) used in the invention may be produced in any suitable manner such as by reacting terephthalic acid or a dialkyl ester of terephthalic acid, e.g., dimethyl terephthalate, with diols having four carbon atoms, e.g., tetramethylene glycol. PBT for use in the invention has an intrinsic viscosity (I.V.) between about 0.5 and about 2.0 dl/g measured in orthochlorophenol at 25° C., with material having an I.V. between about 0.5 and about 1.1 dl/g being preferred. Manufacture of PBT is well known to those skilled in the art as are the techniques for obtaining PBT of desired intrinsic viscosity. Such conventional production techniques for PBT are discussed in greater detail, for instance, in U.S. Pat. No. 3,465,319.

In addition to PBT, compositions of the invention may also include polyethylene terephthalate (PET) or polyproylene terephthalate although PBT must, as indicated above, account for at least 50 wt% of the poly ($C_2$–$C_4$ alkylene terephthalate) used. PET and polypropylene terephthalate may, like PBT, be produced by any suitable conventional methods. PET where used is preferably present in amounts between about 1 and about 35 wt% based on total composition:

Where PET is used in compositions of the invention a nucleating agent such as talc etc. is also preferably employed in amounts between about 0.01 and about 10 wt% based on total composition. The PET function is to reduce warpage problems and reduce cost. PET having an intrinsic viscosity between about 0.4 and about 1.2 dl/g as measured in orthochlorophenol at 25° C. is preferred.

Thermally stable reinforcing fibers used in the invention may be any such fibers which are thermally stable at the conditions normally used in the production of products from PBT molding compositions and include, for instance, fibers of materials such as glass, aramid, calcium sulfate, aluminum metal, boron, asbestos, carbon, fibrous potassium titanate, iron whiskers, etc. Such fibers should normally have diameters between about 5 and about 20 microns and aspect ratios (ratio of length of fiber to diameter of fiber) of at least about 5. Glass fibers are preferred for use in the invention. Glass fibers, where used, preferably have diameters between about 10 and about 15 microns and aspect ratios of at least about 20.

Reinforcing fibers used in the invention are normally used in amounts between about 3 and about 50 wt% based on total weight of total molding composition, more preferably in amounts between about 3 and about 20 wt% on the same basis. As is commonly recognized, the use of such fibers improves substantially such physical properties as tensile strength, flexural strength, flexural modulus and heat distortion temperature of the molding composition. Glass or other fibers for use in the invention may be manufactured and incorporated into the molding composition in any suitable manner, such as by separate extrusion blending with the PBT, extrusion blending with other ingredients of the compositions of the invention or incorporating into the PBT or PBT containing composition during injection molding of products from the molding composition of the invention.

Molding composition of the invention contains between about 1 and about 40 wt% phlogophite mica flake having an average particle size between about 40 and about 325 mesh (i.e. passing through a 40 mesh screen but retained on a 325 mesh screen) with amounts between about 10 and about 30 wt% being preferred. Such mica is readily obtainable from a number of suppliers and is sold for instance by Marietta Resources International under the trade name Suzorite HAR in various size grades. One commonly used grade of such mica is for instance identified as HAR 60-S and has at least about 90% particles in the size range between about 40 and about 200 mesh.

As mentioned, the invention also required the presence of between about 5 and about 30 wt% based on total molding composition of a multiphase composite polymer comprising:

(1) about 25 to about 95 wt% of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reaction groups, at least one of which polymerizes at a substantially different rate of polymerization from at least one other of said reactive groups; and (2) about 75 to 5 wt% of a final, rigid thermoplastic phase polymerized in the presence of said elastomeric phase.

The multiphase composite polymer used in compositions of the invention comprises from about 25 to about 95 wt% of a first elastomeric phase and about 75 to 5 wt% of a final rigid thermoplastic phase. One or more intermediate phases are optional, for example, a middle stage polymerized from about 75 to 100 percent by weight styrene. The first stage is polymerized from about 75 to 99.8 wt% $C_1$ to $C_6$ acrylate resulting in an acrylic rubber core having a glass transition temperature below about 10° C. and crosslinked with 0.1 to 5 percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of adition polymerizable reactive groups, at least one of which polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not generally have a favorable polymerization rate. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

The final stage monomer system can be comprised of $C_1$ to $C_{16}$ methacrylate, styrene, acrylonitrile, alkyl acrylates, allyl acrylates, allyl methacrylate, diallyl methacrylate, and the like, as long as the overall glass transition temperature is at least about 20° C. Preferably the final stage monomer system is at least about 50 wt% $C_1$ to $C_4$ alkyl methacrylate. In a preferred embodiment the final stage monomer system may also contain epoxy functionality. By "epoxy functionality" is meant epoxy units which are pendant from the final stage polymer. The preferred way of incorporating epoxy functionaltiy into the final stage polymer is by use of epoxy containing monomer such as glycidyl acrylate or glycidyl methacrylate in the final stage monomer mixture. Alternate epoxy containing monomers are butadiene monoepoxide, allyl glycidyl ether, 4,5-epoxy pentyl methacrylate or acrylate, 10, 11-epoxy undecyl methacrylate, or other epoxy-containing ethylenically unsaturated monomers. Other ways of introducing epoxy functionality into the final stage of the multiple stage polymer are possible, such as post epoxidation. It is further preferred that the final stage polymer be free of units which tend to degrade poly (alkylene terephthalates), for example, acid, hydroxyl, amino, and amide groups.

For further descriptions and examples of various multiphase polymers suitable for use in the present invention, reference may be had to the aforementioned U.S. Pat. No. 4,096,202 the disclosure of which is incorporated herein by reference. Additional examples of multiphase polymers suitable for use in the invention may be found in U.S. Pat. No. 4,034,013 the disclosure of which is also incorporated herein by reference.

The multiphase polymer serves as an impact modifier to improve impact characteristics of molded articles made from molding composition of the invention. The mica flakes serve a completely unexpected function in eliminating or very substantially reducing the warpage of molded parts which would normally be expected because of the presence of the multiphase polymer or the combination of multiphase polymer and thermally stable reinforcing fibers in molding composition and products of the invention.

In addition to the ingredients mentioned above, compositions and products of the invention may contain suitable flame retardant additives in amounts up to about 25 wt% based on total molding composition and may contain relatively minor amounts of other materials which do not unduly affect the desired characteristics of the finished product. Such additional materials, may, depending upon the particular compositions employed and products desired, include for instance, colorants and lubricants. Where present, such additional materials normally comprise no more than about 20 wt% of the total composition or finished product.

In preparing molded compositions of the invention, the reinforcing fibers may be intimately blended into the PBT by any suitable means such as by dry blending followed by melt blending, blending in extruders, heated rolls or other types of mixers, etc. Conventional master batching techniques may also be used. The same considerations apply to addition of the other essential or optional ingredients of the composition of the invention. Suitable blending and molding techniques are well known in the art and need not be described in detail herein. In a preferred embodiment of the invention, the composition of the invention is compounded by dry blending followed by melt mixing in an extruder with barrel temperatures between about 240° and about 270° C. Likewise, in molding products of the invention from molding compositions of the invention, injection molding is preferred. When injection molding is used, barrel temperatures between about 250° C. and 265° C. are preferred. In a preferred embodiment, the molding composition of the invention is formed by extrusion and pelletized. Products of the invention are then produced by injection molding the pelletized extrudate.

As mentioned above, one of the major advantages of the compositions and products of the invention is that the use of mica in molding compositions of the invention substantially reduces shrinkage and warpage orthwerwise associated with the use of the multiphase polymer or combination of multiphase polymer and reinforcing fibers without substantial harm to the desirable improvements in physical properties associated with the use of such fibers.

While warpage is frequently determined by visual inspection, a quantitative definition can be expressed in terms of percent warp equals $$\frac{(dm - t) \times 100}{t}$$

where "dm" equals maximum distance from a flat surface to a point on a warped side of the article being evaluated, and "t" equals the thickness of the warped side of the article. This equation defines warp in terms of wall thickness without regard to length of the part. Since some absolute deviation from a straight line gives the same percent warp, a correction for part length must also be included to more accurately define warpage of a part in terms of the visual effect of the warp. Part warp (PW) may therefore be defined as $$PW = \frac{\% \text{ warp}}{L} = \frac{(dm - t) \times 100}{t \times L}$$

wherein PW equals part warp, "L" equals total length of the warp member and the other values are as stated immediately above. In evaluating warpage of samples and products, an average warpage value for a five sided plain box is frequently calculated based upon measurements of warpage of the right, left, front and back sides of the box.

The following examples are intended to illustrate the application and usefulness of the invention without limiting the scope thereof. In the example, all quantities are given in terms of wt% based on total composition unless otherwise specified. Physical properties, including warpage, were measured by the following criteria and reported as an average for samples of each composition tested:

| Property | Test Procedures |
|---|---|
| Tensile Yield Strength | ASTM D-638 |
| Flexural Yield Strength | ASTM D-790 |
| Flexural Modulus | ASTM D-790 |
| Notched Izod Impact Strength Cantilever Beam Reversed | ASTM D-256 |
| Notch Izod Impact Strength | ASTM D-256 |
| Percent warp | As defined above |

EXAMPLE 1

PBT (0.8 I.V.) was compounded on a Midland Ross 1.5 inch extruder with various amounts of phlogophite mica and other ingredients as specified below to form various molding compositions as specified in Table I below. The mica used was Marietta Resources International Suzorite HAR 60-S mica flake having the following size distribution.

| trace | −20 + 40 mesh (U.S. sieve) |
|---|---|
| 76% | −40 + 100 mesh |

-continued

| | |
|---|---|
| 19% | −100 + 200 mesh |
| 3% | −200 + 325 mesh |
| 2% | −325 mesh |

Marietta Resources International Suzorite HAR 200-S mica flake was also used. This material had the following size distribution:

| | |
|---|---|
| trace | −20 + 40 mesh (U.S. sieve) |
| 1% | −40 + 100 mesh |
| 55% | −100 + 200 mesh |
| 20% | −200 + 325 mesh |
| 24% | −325 mesh |

The following conditions were employed:

| Extruder Zone | Temperatures | Back Pressure 0–200 |
|---|---|---|
| 1 | 270° C. | Amperage 12–25 |
| 2 | 265° C. | Screw rpm 90 |
| 3 | 260° C. | |
| 4 | 255° C. | Melt temperature 243–251° C. |
| 5 | 250° C. | |

Each of the experimental molding compositions specified in Table I and produced as described above was than molded on a 50 ton 3 ounce reciprocating screw injection molding machine to provide ASTM test specimens. Parts suitable for measuring warpage (camera slide storage box with four large flat sides) were molded on a 250 ton 36 ounce Impco screw ram machine. Molding conditions were:

| 3 oz., 50 ton molding machine | | |
|---|---|---|
| Barrel temperature | front | 480° F. |
| | rear | 480° F. |
| | nozzle | 480° F. |
| Injection pressure | | 1100 psi |
| Screw rpm | | 75 |
| Injection time | | 10 sec. |
| Mold time | | 20 sec. |
| Total cycle time | | 30 sec. |
| Mold temperature | | 100° F. |
| 36 oz., 350 ton molding machine | | |
| Barrel temperature | front | 480° F. |
| | center | 480° F. |
| | rear | 480° F. |
| | nozzle | 490° F. |
| Measured melt temperature | | 420° F. |
| Screw rpm | | 80 |
| Total cycle time | | 94 sec. |
| Mold temperature | | 175° F. |
| Mold time | | 40 sec. |
| Injection pressure | | 1100 psi |

Physical properties were as shown in Table II below.

TABLE I
EXPERIMENTAL MOLDING COMPOUNDS

| | Wt % | | |
|---|---|---|---|
| Ingredient | 1 | 2 | 3 |
| PBT (0.8 I.V.) | 25 | 25 | 30 |
| PET (0.8 I.V.) | 20 | 20 | 20 |
| 60-S Mica Flake | 20 | | |
| 200-S Mica Flake | | 20 | 15 |
| Glass Fibers (OCF 419 AA 3/16 inch) | 20 | 20 | 20 |
| KM 330 Acrylic Impact Modifier | 14.3 | 14.3 | 14.3 |
| Acrawax C Lubricant | 0.2 | 0.2 | 0.2 |
| Epon 815 Diepoxy Modifier | 0.5 | 0.5 | 0.5 |

TABLE II
PHYSICAL PROPERTIES OF EXPERIMENTAL MOLDING COMPOSITIONS

| | Wt % | | |
|---|---|---|---|
| | 1 | 2 | 3 |
| % Warp Annealed | 100 | 120 | |
| % Warp Unannealed | 81 | 97 | |
| Notched Izod Impact Strength (Foot Pounds per Inch) | 1.8 | 1.7 | 1.4 |
| Cantilever Beam Reversed Notch Izod Impact Strength (Foot Pounds per Inch) | 7.8 | 8.2 | 7.5 |
| Flexural Strength (psi) | 18,000 | 19,100 | 16,300 |
| Flexural Modulus (psi) × $10^6$ | 1.23 | 1.27 | .90 |
| Tensile Strength (psi) | 11,430 | 12,308 | 10,000 |

EXAMPLE 2

In order to evaluate the effect of various additives and combinations of additives or warpage characteristics of injection molded PBT articles, a number of molding compositions were prepared from which parts were molded and tested for warpage, all as described in Example 1. The compositions tested and warpage data obtained are shown in table III. To simplify comparisons, table III also shows warpage as a percent of the warpage obtained using PBT molding compound with no additives.

TABLE III
WARPAGE OF MOLDED PARTS

| COMPOSITION NO. | PBT (0.8 I.V.) | 60S MICA FLAKE | 200S MICA FLAKE | GLASS FIBERS (OCF 419 AA 3/16") | KM330 ACRYLIC IMPACT MODIFIER | % ANNEALED | ANNEALED % INCREASE OR DECREASE FROM 100% PBT | UN ANNEALED | UNANNEALED % INCREASE OR DECREASE FROM 100% PBT |
|---|---|---|---|---|---|---|---|---|---|
| 1 | 100 | | | | | 150 | — | 147 | — |
| 2 | 70 | | | 30 | | 399 | +249 | 295 | +148 |
| 3 | 85.5 | | | | 14.5 | 171 | +21 | 198 | +51 |
| 4 | 80 | 20 | | | | 107 | −43 | 121 | −26 |
| 5 | 80 | | 20 | | | 175 | +25 | 161 | +14 |
| 6 | 60 | 20 | | 20 | | 142 | −8 | 121 | −26 |
| 7 | 60 | | 20 | 20 | | 309 | +159 | 228 | +81 |
| 8 | 80 | | | 20 | | 251 | +101 | 217 | +70 |
| 9 | 65.5 | 20 | | | 14.5 | 100 | −50 | 121 | −26 |
| 10 | 65.5 | | 20 | | 14.5 | 238 | +88 | 197 | +50 |
| 11 | 45.5 | 20 | | 20 | 14.5 | 213 | +63 | 171 | +24 |

TABLE III-continued
WARPAGE OF MOLDED PARTS

| COMPOSITION NO. | INGREDIENTS (WT %) | | | | | WARPAGE | | | |
|---|---|---|---|---|---|---|---|---|---|
| | PBT (0.8 I.V.) | 60S MICA FLAKE | 200S MICA FLAKE | GLASS FIBERS (OCF 419 AA 3/16") | KM330 ACRYLIC IMPACT MODIFIER | ANNEALED | | UNANNEALED | |
| | | | | | | % ANNEALED | % INCREASE OR DECREASE FROM 100% PBT | % UNANNEALED | % INCREASE OR DECREASE FROM 100% PBT |
| 12 | 45.5 | 20 | | 20 | 14.5 | 152 | +2 | 126 | −21 |

From table III it can be seen that the presence of mica flakes, especially the 60-S grade, resulted in much less warpage of molded parts than would have been expected based on warpage of parts containing multiphase polymer or a combination of multiphase polymer and glass fibers.

As mentioned above, flame retardant additives may be used in compositions and products of the invention. Preferred flame retardant additives for this purpose include decabromodiphenyl ether, brominated phenylene oxide, brominated polycarbonate brominated polystyrene, tetrabromo phthalic anhydride and antimony trioxide.

Between about 5 and about 40 wt% based on total molding composition of Poly ($C_2$-$C_4$ alkylene terephthalate-co-alkylene-oxide) is also preferably used in compositions of the invention. Preferred Poly ($C_2$-$C_4$ alkylene terephthalate-co-alkylene-oxide) for use in the invention is poly (butylene terephthalate-co-tetramethylene oxide). Suitable Poly ($C_2$-$C_4$ alkylene terephthalate-co-alkylene-oxide) elastomers and their preparation are well known as described for instance in U.S. Pat. No. 3,766,146. Poly (butylene terephthalate-co-tetramethylene oxide) having a Shore D hardness between about 50 and about 60 and a melt index between about 7 and about 9 is particularly preferred.

While the invention has been described above with respect to certain preferred embodiments thereof, it will be apparent to those skilled in the art that various changes and modifications can be made without departing from the spirit or scope of the invention.

What is claimed is:

1. Polyester molding composition consisting essentially of at least about 40 wt% poly ($C_2$-$C_4$ alkylene terephthalate) with at least about 50 wt% of such poly ($C_2$-$C_4$ alkylene terephthalate) being polybutylene terephthalate having an intrinsic viscosity between about 0.5 and about 2.0 dl/g, such composition containing:
   (a) between about 1 and about 40 wt% based on total molding composition of phlogophite mica flakes having an average particle size between about 40 and 325 mesh with at least 90% of all mica flakes present in the composition having particle sizes between about 40 and about 200 mesh; and
   (b) between about 5 and about 30 wt% based on total molding composition of a multiphase composite polymer comprising;
   (1) about 25 to about 95 wt% of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and
   (2) about 75 to 5 wt% of a final, rigid thermoplastic phase polymerized in the presence of said elastomeric phase.

2. Molding composition according to claim 1 which contains between about 1% and about 40% wt% based on total molding composition of polyethylene terephthalate.

3. Molding composition according to claim 2 which also contains between about 0.01 and about 10% wt% based on total molding composition of a nucleating agent.

4. Molding composition according to claim 1 which also contains between about 3 and about 50 wt% based on total molding composition of thermally stable reinforcing fibers having diameters between about 5 and about 20 microns and aspect ratios of at least about 5 and wherein at least a majority of the mica flakes present in the composition have particle sizes between about 40 and about 100 mesh.

5. Molding composition according to claim 4 wherein the reinforcing fibers are glass fibers.

6. Molding composition according to claim 5 wherein the glass fibers have diameters between about 10 and about 15 microns and aspect ratios of at least about 20.

7. Composition according to claim 1 wherein the final rigid thermoplastic phase of the multiphase polymer contains epoxy groups.

8. Composition according to claim 7 wherein the epoxy groups are derived from glycidyl acrylate or glycidyl methacrylate.

9. Composition according to claim 1 wherein said graftlinking monomer is allyl methacrylate or diallyl maleate.

10. Composition according to claim 1 wherein the crosslinking monomer is butylene diacrylate.

11. Composition according to claim 1 wherein the final rigid thermoplastic phase of the multiphase polymer is polymerized from a monomer system comprising from about 50 to 100 wt% of a $C_1$ to $C_4$ alkyl methacrylate.

12. Composition according to claim 1 wherein the final phase monomer system is free of acid, hydroxyl, amino and amide groups and wherein the glass transition temperature of the final thermoplastic phase is at least about 20° C.

13. Composition according to claim 1 which also contains between about 3 and about 50 wt% based on total molding composition of glass reinforcing fibers having diameters between about 5 and about 20 microns and aspect ratios of at least about 5, and wherein at least a majority of the mica flakes present in the composition have particle sizes between about 40 and about 100 mesh and wherein said first phase of the multiphase polymer comprises between about 60 and about 95 wt% of said multiphase polymer, said first phase is polymerized from a monomer system comprising between 95 and about 99.8 percent by weight butyl acrylate, between about 0.1 and about 2.5 wt% butylene diacylate as a crosslinking agent, and between about 0.1 and about 2.5% allyl methacrylate or diallyl maleate as a graftlinking agent and said final phase of said multiphase polymer is polymerized from about 60 to 100 wt% methyl methacrylate.

14. Composition according to claim 1 wherein the poly ($C_2$–$C_4$ alkylene terephthalate) is essentially polybutylene terephthalate.

15. Composition according to claim 14 which also includes between about 3 and about 50 wt% based on total molding composition of glass reinforcing fibers having diameters between about 5 and about 20 microns and aspect ratios of at least about 5.

16. An injection molded article molded from molding composition of claim 1.

17. An injection molded article molded from molding composition of claim 2.

18. An injection molded article molded from molding composition of claim 4.

19. An injection molded article molded from molding composition of claim 5.

20. An injection molded article molded from molding composition of claim 13.

* * * * *